US011619736B2

(12) United States Patent
Sugae et al.

(10) Patent No.: US 11,619,736 B2
(45) Date of Patent: Apr. 4, 2023

(54) OBJECT DETECTION DEVICE

(71) Applicant: AISIN SEIKI KABUSHIKI KAISHA, Kariya (JP)

(72) Inventors: Ippei Sugae, Kariya (JP); Koichi Sassa, Kariya (JP)

(73) Assignee: AISIN CORPORATION, Kariya (JP)

(*) Notice: Subject to any disclaimer, the term of this patent is extended or adjusted under 35 U.S.C. 154(b) by 60 days.

(21) Appl. No.: 17/208,413

(22) Filed: Mar. 22, 2021

(65) Prior Publication Data
US 2022/0057506 A1    Feb. 24, 2022

(30) Foreign Application Priority Data

Aug. 20, 2020    (JP) .............................. JP2020-139490

(51) Int. Cl.
*G01S 15/08* (2006.01)
*G01S 15/931* (2020.01)

(52) U.S. Cl.
CPC ............ *G01S 15/08* (2013.01); *G01S 15/931* (2013.01); *G01S 2015/938* (2013.01)

(58) Field of Classification Search
CPC combination set(s) only.
See application file for complete search history.

(56) References Cited

U.S. PATENT DOCUMENTS

| 4,884,192 | A  | * | 11/1989 | Terada ................ G06F 15/8015 709/251 |
| 6,628,227 | B1 | * | 9/2003  | Rao ...................... G01S 15/876 342/70 |
| 6,680,689 | B1 | * | 1/2004  | Zoratti .................... B60Q 9/008 340/436 |
| 7,545,956 | B2 | * | 6/2009  | Miyahara ................ G01S 15/86 382/106 |
| 9,542,845 | B1 | * | 1/2017  | Mayer ....................... G08G 1/04 |
| 9,616,814 | B1 | * | 4/2017  | Chiang ................ G01S 15/931 |
| 9,734,744 | B1 | * | 8/2017  | McGie ............ G08G 1/096741 |
| 9,791,557 | B1 | * | 10/2017 | Wyrwas .................. G01S 7/497 |
| 9,824,337 | B1 | * | 11/2017 | Rodoni ................. G06Q 10/30 |
| 2014/0240167 | A1 | * | 8/2014 | Cho ........................ G08G 1/052 342/104 |
| 2017/0028986 | A1 | * | 2/2017 | Kuroda .................... G01S 17/86 |
| 2017/0153329 | A1 | * | 6/2017 | Kodama ................. G01S 17/42 |

(Continued)

FOREIGN PATENT DOCUMENTS

JP        2006-292597 A       10/2006

*Primary Examiner* — Daniel L Murphy
*Assistant Examiner* — Amie M Ndure
(74) *Attorney, Agent, or Firm* — Sughrue Mion, PLLC

(57) ABSTRACT

An object detection device that detects an object existing around a moving body moving on a road surface by a TOF method, the object detection device includes: a first acquisition unit that acquires target information including distance information of a detection target on the basis of a comparison result between a signal level of a reflected wave and a first threshold value; a second acquisition unit that acquires road surface information including distance information of the road surface on the basis of a comparison result between the signal level of the reflected wave and a second threshold value; and a setting unit that sets the second threshold value so that an amount of the distance information acquired within a predetermined period does not exceed a predetermined amount.

6 Claims, 6 Drawing Sheets

(56) References Cited

U.S. PATENT DOCUMENTS

| | | | |
|---|---|---|---|
| 2020/0238993 A1* | 7/2020 | Urano | G05D 1/0061 |
| 2021/0055401 A1* | 2/2021 | Takayama | G01S 7/4056 |
| 2021/0163014 A1* | 6/2021 | Kimura | B60W 50/14 |
| 2021/0165012 A1* | 6/2021 | Kimura | G01P 3/44 |

* cited by examiner

OBJECT DETECTION DEVICE

CROSS REFERENCE TO RELATED APPLICATIONS

This application is based on and claims priority under 35 U.S.C. § 119 to Japanese Patent Application No. 2020-139490, filed on Aug. 20, 2020, the entire content of which is incorporated herein by reference.

TECHNICAL FIELD

The present disclosure relates to an object detection device.

BACKGROUND DISCUSSION

In a traveling support system or the like mounted on a vehicle, a device that detects an object existing around the vehicle by a TOF (Time Of Flight) method is used. The TOF method is a method of detecting existence or nonexistence of an object, a distance to the object, and the like on the basis of time until a transmission wave (an ultrasonic wave, an electromagnetic wave, or the like) transmitted to the object is reflected by the object and returned.

For example, there has been disclosed a technique for reducing influence of noise due to a reflected wave from a road surface by using a movement average value of a signal level of the reflected wave in a device that detects an object by the TOF method (Japanese Patent Laid-Open No. 2006-292597).

In the traveling support system or the like, TOF information (road surface information) corresponding to the road surface may be used in order to grasp a road surface condition or the like. The acquired road surface information is usually transmitted to an external device such as an electronic control unit (ECU) that analyzes the road surface information via a transmission line such as a data bus. At this time, if an amount of road surface information is excessive with respect to a transmission capability of the transmission line, there is a possibility that the road surface information cannot be effectively used.

A need thus exists for an object detection device which is not susceptible to the drawback mentioned above.

SUMMARY

An object detection device as one example of the present disclosure is an object detection device that detects an object existing around a moving body moving on a road surface by a TOF method, the object detection device including: a first acquisition unit that acquires target information including distance information of a detection target on the basis of a comparison result between a signal level of a reflected wave and a first threshold value; a second acquisition unit that acquires road surface information including distance information of the road surface on the basis of a comparison result between the signal level of the reflected wave and a second threshold value; and a setting unit that sets the second threshold value so that an amount of the distance information acquired within a predetermined period does not exceed a predetermined amount.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of the present disclosure will be described with reference to the drawings. A configuration of the embodiment described below, and actions and effects brought about by the configuration are merely examples, and are not limited to contents described below.

Figure 1:
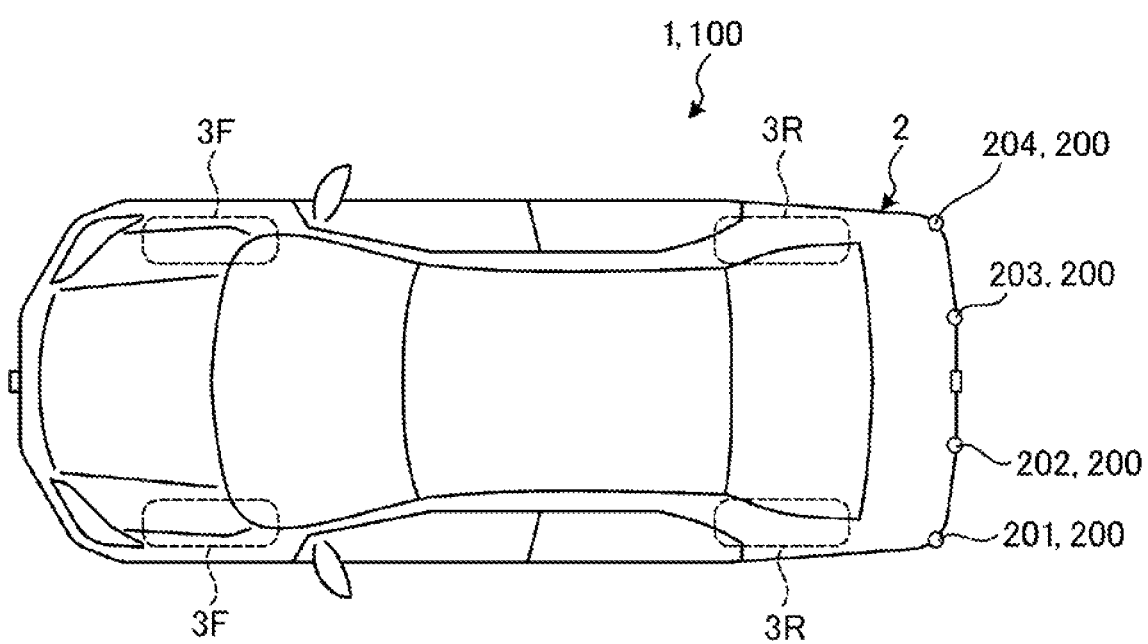
FIG. 1 is a top view showing an example of an appearance of a vehicle including a vehicle control system according to an embodiment.

FIG. 1 is a top view showing an example of an appearance of a vehicle 1 including a vehicle control system according to the embodiment. The vehicle 1 is an example of a moving body that moves on a road surface. The vehicle control system illustrated below is a system that detects an object existing around the vehicle 1 by a TOF method using an ultrasonic wave, and controls the vehicle on the basis of a detection result.

As shown in FIG. 1, the vehicle control system includes an ECU 100 mounted inside the vehicle 1 having a pair of front wheels 3F and a pair of rear wheels 3R, and object detection devices 201 to 204 mounted on an exterior of the vehicle 1.

In the example shown in FIG. 1, the object detection devices 201 to 204 are installed at different positions from each other in a rear end portion (e.g., a rear bumper) of a vehicle body 2 as the exterior of the vehicle 1.

In the present embodiment, hardware configurations and functions of the object detection devices 201 to 204 are the same. Therefore, in the following, for the sake of simplicity, the object detection devices 201 to 204 may be collectively referred to as an object detection device 200.

Further, in the present embodiment, an installation position of the object detection device 200 is not limited to the example shown in FIG. 1. The object detection device 200 may be installed in a front end portion (e.g., a front bumper or the like) of the vehicle body 2, may be installed in a side surface portion of the vehicle body 2, or may be installed in two or more of the rear end portion, the front end portion, and the side surface portion. Further, the number of the object detection devices 200 is not limited to the example shown in FIG. 1.

Figure 2:
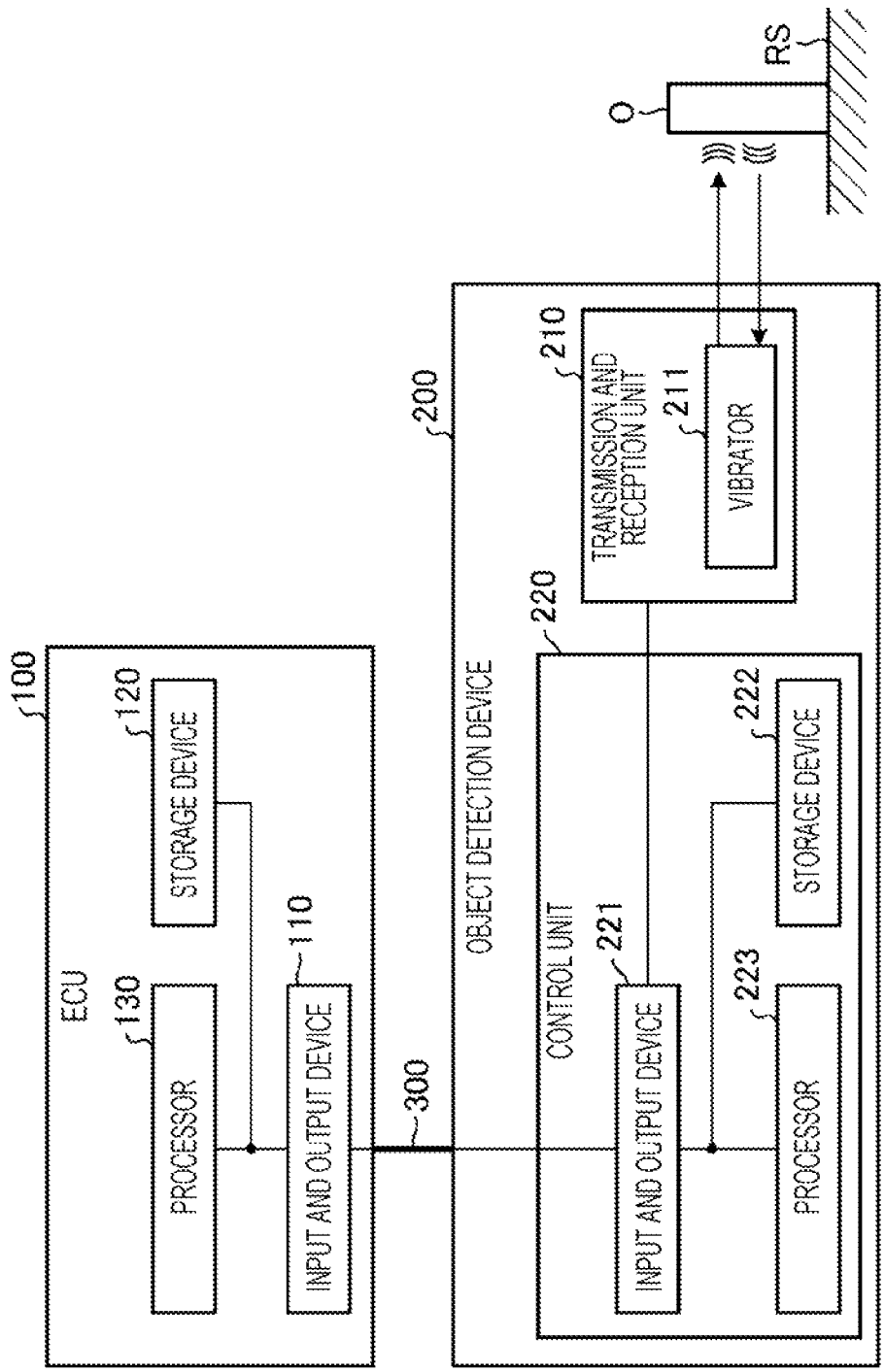
FIG. 2 is a block diagram showing an example of a hardware configuration of an ECU and an object detection device according to the embodiment.

FIG. 2 is a block diagram showing an example of a hardware configuration of the ECU 100 and the object detection device 200 according to the embodiment.

As shown in FIG. 2, the ECU 100 has the same hardware configuration as a normal computer. Specifically, the ECU 100 includes an input and output device 110, a storage device 120, and a processor 130.

The input and output device 110 is an interface that implements transmission and reception of information between the ECU 100 and an external device (the object detection device 200 in the example shown in FIG. 1). The input and output device 110 transmits and receives information via a data bus 300 (transmission line) that electrically connects the ECU 100 and the object detection device 200.

The storage device 120 includes a main storage device such as a ROM (Read Only Memory) and a RAM (Random Access Memory), and/or an auxiliary storage device such as an HDD (Hard Disk Drive) and an SSD (Solid State Drive).

The processor 130 controls various types of processing executed in the ECU 100. The processor 130 includes an arithmetic unit such as, for example, a central processing unit (CPU). The processor 130 implements various functions such as automatic driving and alarm output by reading and executing a program stored in the storage device 120.

The object detection device 200 includes a transmission and reception unit 210 and a control unit 220.

The transmission and reception unit 210 has a vibrator 211 such as a piezoelectric element, and the vibrator 211 implements transmission and reception of an ultrasonic wave. Specifically, the transmission and reception unit 210 transmits an ultrasonic wave generated in accordance with vibration of the vibrator 211 as a transmission wave and receives, as a reflected wave, vibration of the vibrator 211 brought about by reflection and return of the ultrasonic wave by an external object, the ultrasonic wave having been transmitted as the transmission wave. FIG. 2 illustrates an obstacle O installed on a road surface RS as a detection target.

Note that while FIG. 2 illustrates a configuration in which the transmission of the transmission wave and the reception of the reflected wave are implemented by the single transmission and reception unit 210 having the single vibrator 211, the embodiment is not limited thereto. For example, a configuration may be employed in which a configuration on a transmission side and a configuration on a reception side are separated, such as a configuration in which a first vibrator for transmitting the transmission wave and a second vibrator for receiving the reflected wave are separately provided.

The control unit 220 has a hardware configuration similar to that of a normal computer. Specifically, the control unit 220 includes an input and output device 221, a storage device 222, and a processor 223.

The input and output device 221 is an interface that implements transmission and reception of information between the control unit 220 and the external devices (the ECU 100 and the transmission and reception unit 210 in the example shown in FIG. 2). The input and output device 221 transmits and receives the information via the data bus 300.

The storage device 222 includes a main storage device such as a ROM and a RAM, and/or an auxiliary storage device such as an HDD and an SSD.

The processor 223 controls various types of processing executed by the control unit 220. The processor 223 includes an arithmetic unit such as, for example, a CPU. The processor 223 implements various functions by reading and executing a program stored in the storage device 333.

The object detection device 200 according to the present embodiment detects a distance to a detection target (e.g., another vehicle, an obstacle on a road, a person, or the like) existing around the vehicle 1 by the TOF method. The TOF method is a technique of calculating the distance to the object on the basis of a difference between timing when the transmission wave is transmitted (more specifically, it starts to be transmitted) and timing when the reflected wave is received (more specifically, it starts to be received).

Figure 3:
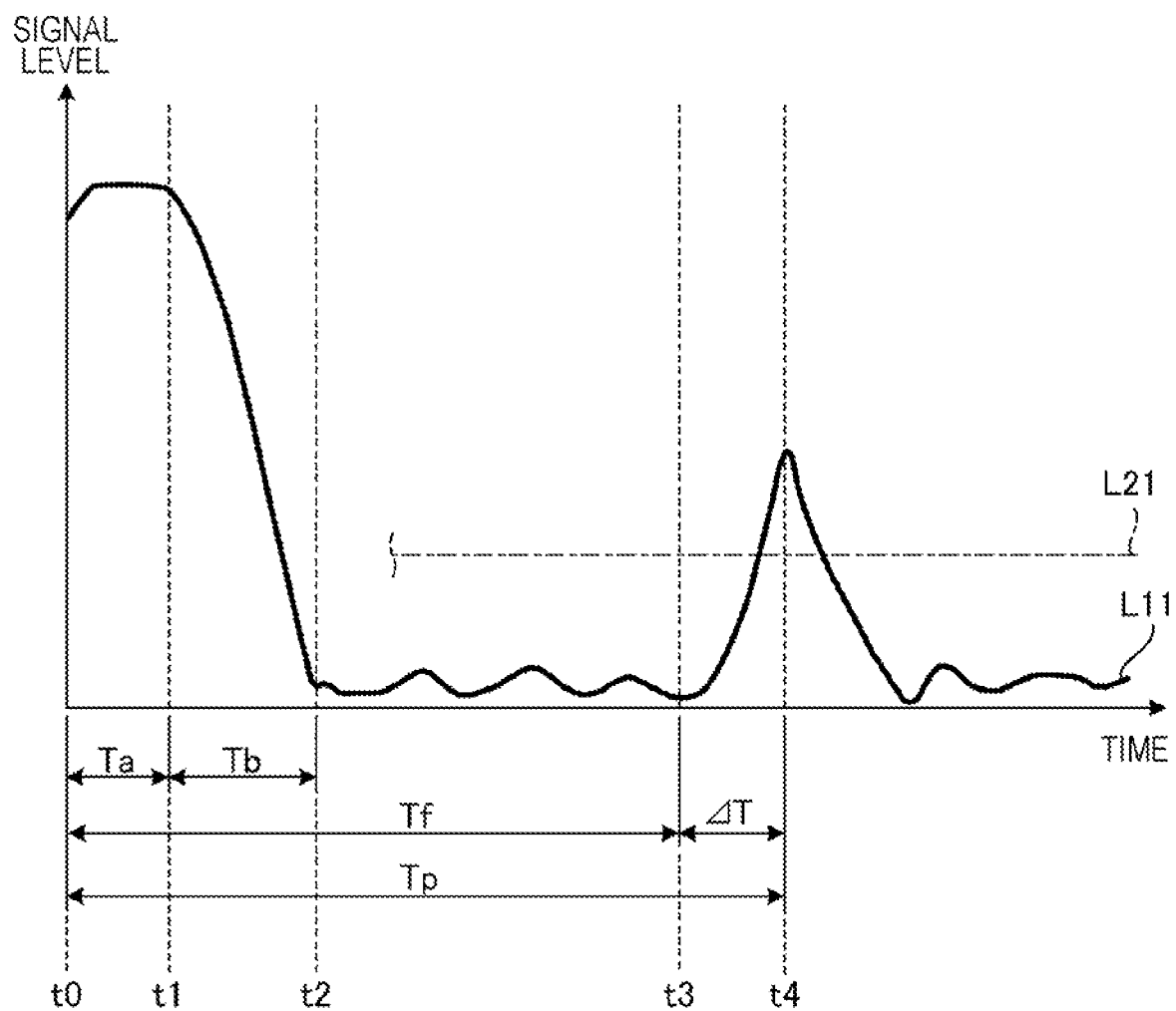
FIG. 3 is a diagram showing an example of an object detection method by a TOF method according to the embodiment.

FIG. 3 is a diagram showing an example of an object detection method by the TOF method according to the embodiment. More specifically, FIG. 3 is a diagram illustratively and schematically showing, in a graph format, change over time in a signal level (e.g., an amplitude) of the ultrasonic wave transmitted and received by the object detection device 200. In a graph shown in FIG. 3, a horizontal axis corresponds to time, and a vertical axis corresponds to a signal level of a signal transmitted and received by the object detection device 200 via the transmission and reception unit 210 (vibrator 211).

In the graph shown in FIG. 3, an envelope L11 indicated by a solid line shows an example of the change over time in the signal level of the signal transmitted and received by the object detection device 200, that is, a degree of the vibration of the vibrator 211. From this envelope L11, it can be understood that the vibrator 211 is driven and vibrates for time Ta from timing t0, so that the transmission of the transmission wave is completed at timing t1, and then the vibration of the vibrator 211 due to inertia continues while attenuating for time Tb until the timing t2 is reached. Therefore, in the graph shown in FIG. 3, the time Tb corresponds to so-called reverberation time.

The envelope L11 reaches a peak at timing t4 when time Tp elapses from the timing t0 when the transmission of the transmission wave starts, and at the peak, the degree of the vibration of the vibrator 211 exceeds (or, equal to or higher than) a target threshold value L21 (first threshold value) indicated by an alternate long and short dash line. The target threshold value L21 is a value set to identify whether the vibration of the vibrator 211 is caused by the reception of the reflected wave from a detection target (e.g., the obstacle O), or the by the reception of the reflected wave from an object other than the detection target (e.g., the road surface RS).

Note that while FIG. 3 shows an example in which the target threshold value L21 is set as a constant value that does not change with time elapse, the target threshold value L21 may be set as a value that changes with time elapse.

Here, the vibration having a peak exceeding (or, equal to or higher than) the target threshold value L21 can be considered to be caused by the reception of the reflected wave from the detection target. On the other hand, vibration having a peak equal to or lower than (or less than) the target threshold value L21 can be considered to be caused by the reception of the reflected wave from an object other than the detection target. Therefore, it can be understood from the envelope L11 that the vibration of the vibrator 211 at the timing t4 is caused by the reception of the reflected wave from the detection target.

Note that in the envelope L11, the vibration of the vibrator 211 attenuates after the timing t4. Therefore, the timing t4 corresponds to timing when the reception of the reflected wave from the detection target is completed, in other words, timing when the transmission wave transmitted last at the timing t1 returns as the reflected wave.

Further, in the envelope L11, timing t3 as a start point of the peak at the timing t4 corresponds to timing when the reception of the reflected wave from the detection target starts, in other words, the transmission wave first transmitted at the timing t0 returns as the reflected wave. Therefore, on the envelope L11, time ΔT between the timing t3 and the timing t4 is equal to the time Ta as transmission time of the transmission wave.

On the basis of the foregoing, in order to find the distance to the detection target by the TOF method, it is necessary to find time Tf between the timing t0 when the transmission wave starts to be transmitted and the timing t3 when the reflected wave starts to be received. This time Tf can be found by subtracting the time ΔT equal to the time Ta as the transmission time of the transmission wave from the time Tp as the difference between the timing t0 and the timing t4 when the signal level of the reflected wave reaches the peak exceeding the threshold value.

The timing t0 when the transmission wave starts to be transmitted can be easily specified as timing when the object detection device 200 starts operating, and the time Ta as the transmission time of the transmission wave is predetermined by setting or the like. Therefore, in order to find the distance to the detection target by the TOF method, it is sufficient to specify the timing t4 when the signal level of the reflected wave exceeds the target threshold value L21 and reaches the peak.

Figure 4:
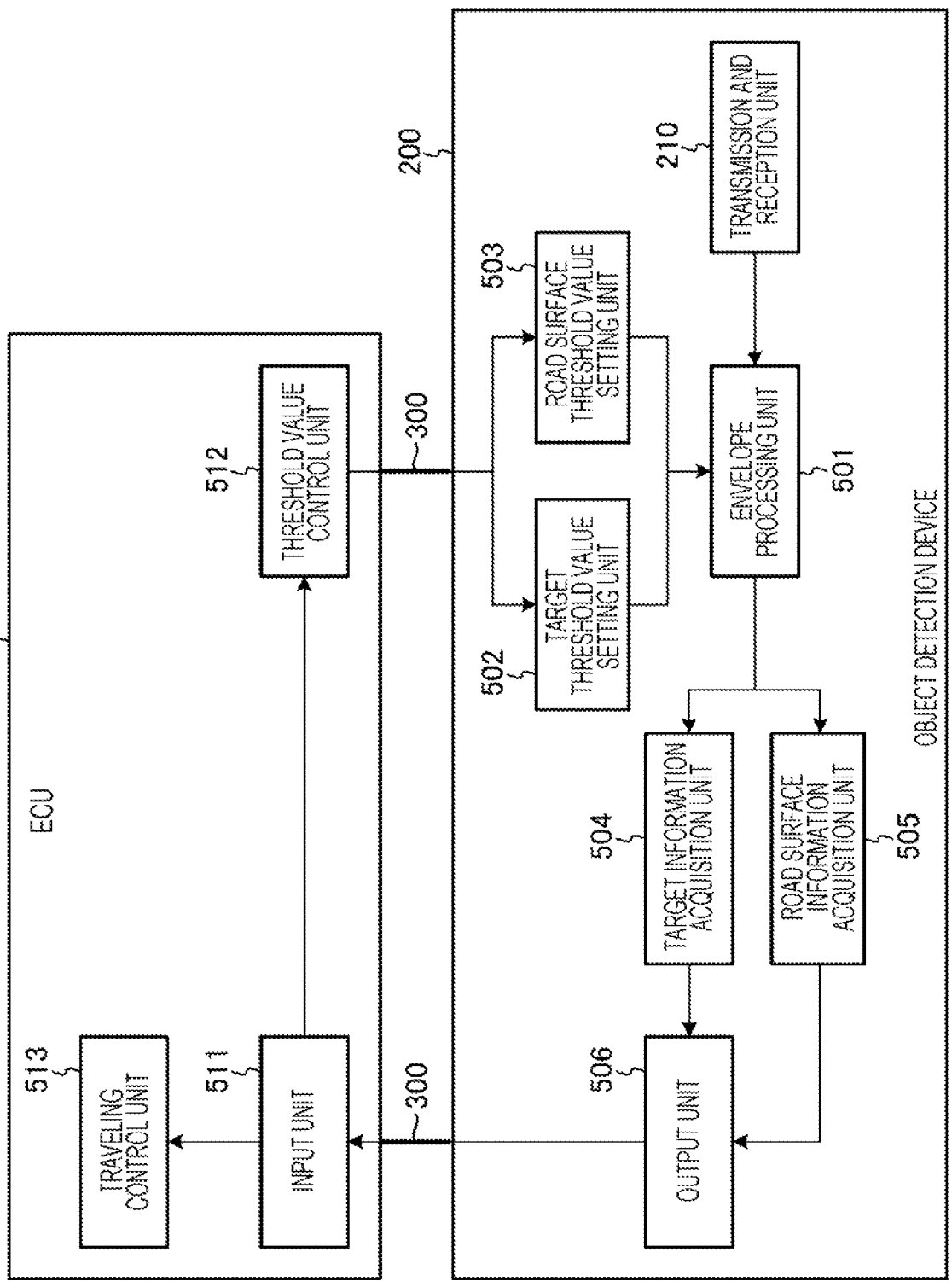
FIG. 4 is a block diagram showing an example of a functional configuration of the ECU and the object detection device according to the embodiment.

FIG. 4 is a block diagram showing an example of a functional configuration of the ECU 100 and the object detection device 200 according to the embodiment.

The object detection device 200 includes an envelope processing unit 501, a target threshold value setting unit 502, a road surface threshold value setting unit 503 (setting unit), a target information acquisition unit 504 (first acquisition unit), a road surface information acquisition unit 505 (second acquisition unit), and an output unit 506. These functional units 501 to 506 are configured by cooperation of the hardware configuration of the control unit 220 shown in FIG. 2, the program stored in the storage device 222, and the like.

The envelope processing unit 501 generates the envelope indicating the change over time in the signal level of the reflected wave on the basis of the signal acquired from the transmission and reception unit 210.

The target threshold value setting unit 502 sets the target threshold value (e.g., the target threshold value L21 shown in FIG. 3: the first threshold value) for acquiring target information including distance information (TOF) of the detection target (e.g., the obstacle O) from the envelope (e.g., the envelope L11) generated by the envelope processing unit 501.

The road surface threshold value setting unit 503 sets a road surface threshold value (second threshold value) for acquiring the road surface information including distance information corresponding to the road surface from the envelope generated by the envelope processing unit 501. A method for setting the road surface threshold value and the like will be described later.

The target information acquisition unit 504 acquires the target information including the distance information of the detection target on the basis of a comparison result between the signal level of the reflected wave indicated by the envelope (e.g., the envelope L11) generated by the envelope processing unit 501 and the target threshold value (e.g., the target threshold value L21) set by the target threshold value setting unit 502.

The road surface information acquisition unit 505 acquires the road surface information including the distance information of the road surface on the basis of the comparison result between the signal level of the reflected wave indicated by the envelope (illustrated later) generated by the envelope processing unit 501, and the road surface threshold value (illustrated later) set by the road surface threshold value setting unit 503.

The output unit 506 outputs the target information acquired by the target information acquisition unit 504 and the road surface information acquired by the road surface information acquisition unit 504 to the ECU 100 via the data bus 300.

The ECU 100 has an input unit 511, a threshold value control unit 512, and a traveling control unit 513. These functional units 511 to 513 are configured by cooperation of the hardware configuration of the ECU 100 shown in FIG. 2, the program stored in the storage device 120, and the like.

The input unit 511 inputs the target information and the road surface information output from the output unit 506 of the object detection device 200 via the data bus 300.

The threshold value control unit 512 performs processing for controlling the target threshold value setting unit 502 and the road surface threshold value setting unit 503 on the basis of the target information and the road surface information input by the input unit 511. The threshold value control unit 512 performs processing for setting the target threshold value L21 adapted to the road surface condition (e.g., a gradient, a road surface roughness, or the like) on the basis of the road surface information. The threshold value control unit 512 outputs a control signal for controlling the target threshold value setting unit 502 and a control signal for controlling the road surface threshold value setting unit 503 via the data bus 300.

The traveling control unit 513 performs processing for controlling the vehicle 1 on the basis of the target information and the road surface information input by the input unit 511.

Figure 5:
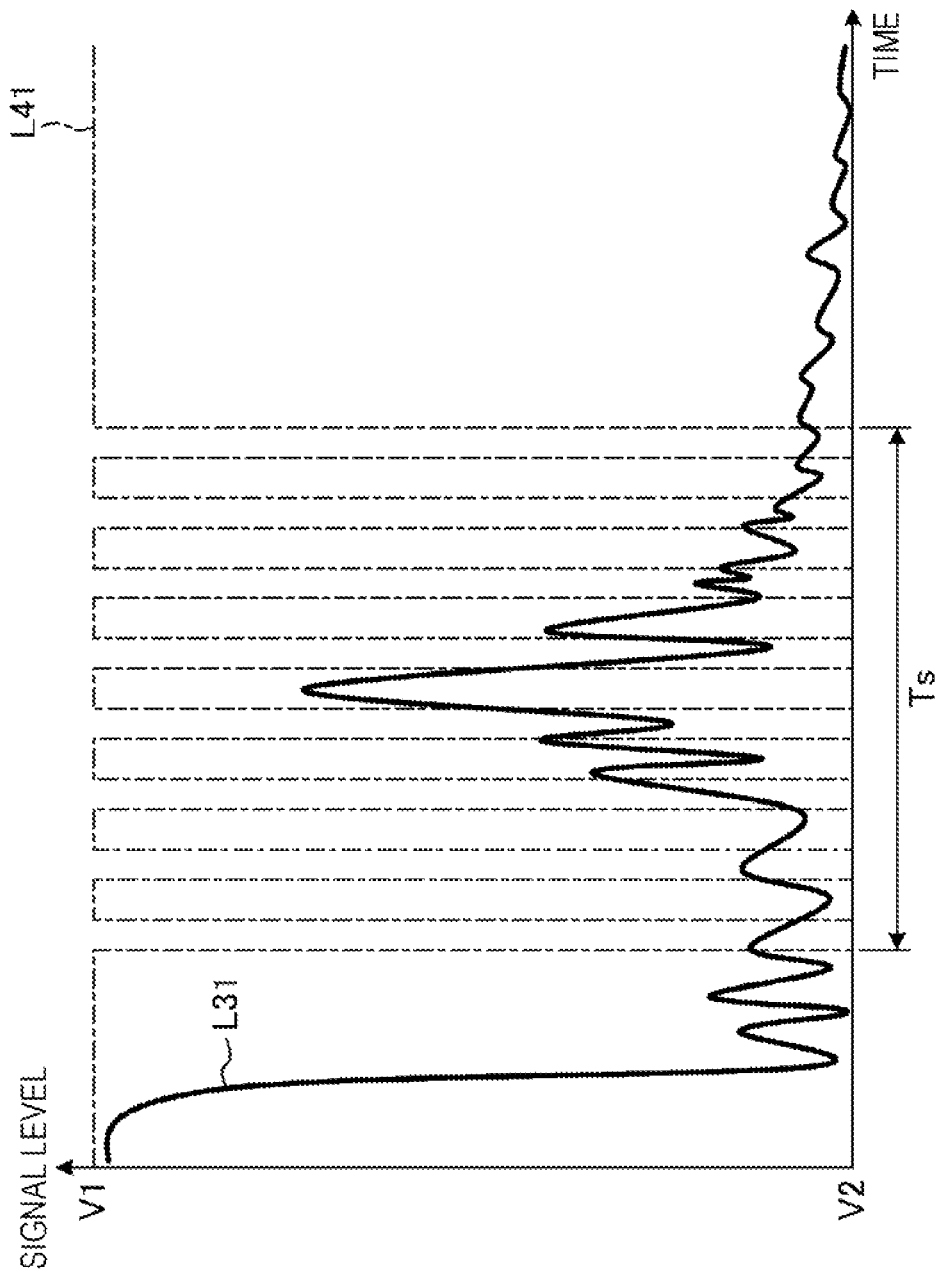
FIG. 5 is a diagram showing an example of a method for setting a road surface threshold value according to the embodiment.

FIG. 5 is a diagram showing an example of a method for setting a road surface threshold value L41 according to the embodiment. In FIG. 5, an envelope L31 showing change over time in the signal level of the reflected wave from the road surface RS and the road surface threshold value L41 are illustrated.

The road surface information is acquired when the signal level of the envelope L31 exceeds (or, equal to or higher than) the road surface threshold value L41. The road surface threshold value L41 according to the present embodiment is set so that an amount of the road surface information acquired within a predetermined period Ts does not exceed a predetermined amount.

The predetermined amount is set so as not to exceed the transmission capability (e.g., an amount of information that can be transmitted per unit time) of the data bus 300. That is, the road surface information is acquired within a range that does not exceed the transmission capability of the data bus 300. This allows the road surface information to be appropriately transmitted to the ECU 100 and effectively used.

The road surface threshold value L41 according to the present embodiment fluctuates in a wavy shape (rectangular wavy shape) so that an upper value V1 and a lower value V2 are alternately repeated in accordance with time elapse in the predetermined period Ts. The road surface information is not acquired in a period corresponding to the upper value V1, but is acquired in a period corresponding to the lower value V2. In the present embodiment, eight pieces of road surface information are acquired within the predetermined period Ts. Note that the upper value V1 and the lower value V2 need not be fixed values. For example, in an environment where noise is large, or the like, the lower value V2 may be arbitrarily set so that the lower value V2 can be set larger than the noise. Further, echo from a long distance with small reflection from an obstacle may be regarded as noise data, and the lower value V2 may be adaptively changed on the basis of an average value or the average value+α.

The predetermined period Ts is preferably a period corresponding to a strong reflection range in which the signal level of the reflected wave from the road surface RS becomes relatively high in a distance range in which the object detection device 200 can detect the object. The strong reflection range is determined in accordance with a design condition of the object detection device 200 (e.g., an installation angle of the transmission and reception unit 210, directivity of the transmission wave, or the like), and can be specified in advance. By setting the predetermined period Ts for acquiring the road surface information to the period corresponding to the strong reflection range, the road surface information can be efficiently acquired. Note that the predetermined period Ts may be variable.

Figure 6:
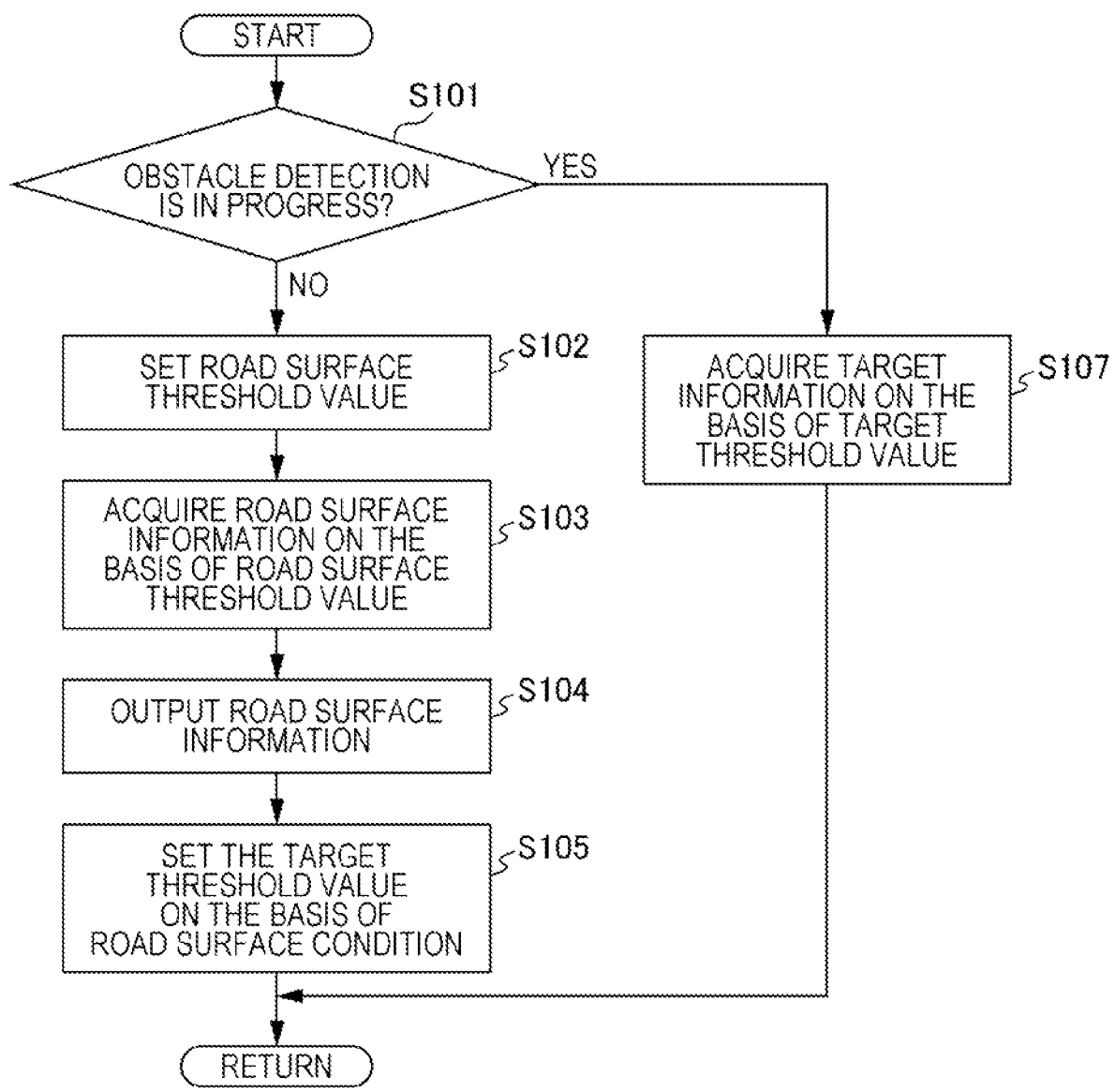
FIG. 6 is a flowchart showing an example of processing by the ECU and the object detection device according to the embodiment.

FIG. 6 is a flowchart showing an example of processing by the ECU 100 and the object detection device 200 according to the embodiment. The threshold value control unit 512 determines whether or not obstacle detection for detecting the detection target is being executed (S101). When the obstacle detection is being executed (S101: Yes), the target information acquisition unit 504 acquires the target information on the basis of the target threshold value L21 (S107), and then step S101 is executed again.

When the obstacle detection is not being executed (S101: No), the threshold value control unit 512 outputs an instruction signal to the road surface threshold value setting unit 503, and the road surface threshold value setting unit 503 sets the road surface threshold value L41 in accordance with the instruction signal (S102). After that, the road surface information acquisition unit 505 acquires the road surface information on the basis of the set road surface threshold value L41 (S103), and the output unit 506 outputs the acquired road surface information to the ECU 100 via the data bus 300 (S104). The threshold value control unit 512 sets the target threshold value L21 so that the influence of the road surface RS is reduced on the basis of the road surface condition (the gradient, the road surface roughness, or the like) estimated from the road surface information (S105). After that, step S101 is executed again.

Program that cause the processors 130, 223, and the like to execute the processing for implementing the various functions in the above-described embodiment are files in an installable format or an executable format, each of which can be recorded and provided on a computer-readable recording medium such as a CD (Compact Disc)-ROM, a flexible disc (FD), or a CD-R (Recordable) or DVD (Digital Versatile Disk). In addition, the programs may be provided or distributed via a network such as the Internet.

According to the above-described embodiment, the amount of the road surface information can be matched with the transmission capability of the data bus 300, so that the road surface information can be effectively used.

An object detection device as one example of the present disclosure is an object detection device that detects an object existing around a moving body moving on a road surface by a TOF method, the object detection device including: a first acquisition unit that acquires target information including distance information of a detection target on the basis of a comparison result between a signal level of a reflected wave and a first threshold value; a second acquisition unit that acquires road surface information including distance information of the road surface on the basis of a comparison result between the signal level of the reflected wave and a second threshold value; and a setting unit that sets the second threshold value so that an amount of the distance information acquired within a predetermined period does not exceed a predetermined amount.

According to the above-described configuration, the amount of the road surface information can be suppressed to an appropriate range. This allows the road surface information to be effectively used.

Further, the object detection device may further include an output unit that outputs the road surface information to an external device via a transmission line, and the predetermined amount may be set so as not to exceed a transmission capability of the transmission line.

According to the above-described configuration, the amount of the road surface information can be adapted to the transmission capability of the transmission line.

Further, the first threshold value may be set on the basis of the road surface information.

According to the above-described configuration, the first threshold value for detecting the detection target can be appropriately set in accordance with the road surface condition or the like grasped on the basis of the road surface information.

Further, the second acquisition unit may acquire the road surface information when the first acquisition unit does not perform processing for acquiring the target information.

According to the above-described configuration, the first threshold value can be appropriately set on the basis of the road surface information while the processing for acquiring the target information is not performed.

Further, the second threshold value may fluctuate so that an upper value and a lower value smaller than the upper value are alternately repeated with time elapse, and the road surface information may not be acquired in a period corresponding to the upper value, but may be acquired in a period corresponding to the lower value.

As described above, the amount of the acquired road surface information can be adjusted by changing the second threshold value in a wavy shape in which the upper value and the lower value are alternately repeated.

Further, the predetermined period may be a period corresponding to a strong reflection range in which the signal level of the reflected wave from the road surface becomes relatively high in a detectable distance range.

The strong reflection range is determined in accordance with the design condition of the object detection device (e.g., the installation angle of the transmission and reception unit, the directivity of the transmission wave, and the like), and can be specified in advance. By setting the predetermined period for acquiring the road surface information to the period corresponding to the strong reflection range, the road surface information can be efficiently acquired.

Although the embodiment of the present disclosure has been described above, the above-described embodiment is merely an example, and the scope of the present disclosure is not intended to be limited. The novel embodiment described above can be carried out in various forms, and various omissions, replacements, and modifications can be made without departing from the gist of the present disclosure. The above-described embodiment is included in the scope and gist of the present disclosure, as well as the present disclosure in the scope of the claims described in the claims and the equivalent scope thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An object detection device that detects an object existing around a moving body moving on a road surface by a TOF method, the object detection device comprising:
   at least one processor configured to implement:
   a first acquisition unit that acquires target information including distance information of a detection target on the basis of a comparison result between a signal level of a reflected wave and a first threshold value;
   a second acquisition unit that acquires road surface information including distance information of the road surface on the basis of a comparison result between the signal level of the reflected wave and a second threshold value; and
   a setting unit that sets the second threshold value to control an amount of data of the distance information acquired within a predetermined period to not exceed a predetermined amount.

2. The object detection device according to claim 1 further comprising an output unit that outputs the road surface information to an external device via a transmission line, wherein the predetermined amount is set so as not to exceed a transmission capability of the transmission line.

3. The object detection device according to claim 1, wherein the first threshold value is set on the basis of the road surface information.

4. The object detection device according to claim 3, wherein the second acquisition unit acquires the road surface information when the first acquisition unit does not perform processing for acquiring the target information.

5. The object detection device according to claim 1, wherein the second threshold value fluctuates so that an upper value and a lower value smaller than the upper value are alternately repeated with time elapse, and the road surface information is not acquired in a period corresponding to the upper value, but is acquired in a period corresponding to the lower value.

6. The object detection device according to claim 1, wherein the predetermined period is a period corresponding to a strong reflection range in which the signal level of the reflected wave from the road surface becomes relatively high in a detectable distance range.

* * * * *